Patented Sept. 7, 1948

2,448,621

UNITED STATES PATENT OFFICE 2,448,621

COMPOSITION CONTAINING TALL OIL RESINS

William J. Rice, Brooklyn, N. Y.

No Drawing. Application April 10, 1945,
Serial No. 587,607

9 Claims. (Cl. 106—123)

The present application is directed to the making of resinous materials particularly those adapted for use in liquid coating compositions and more particularly the invention relates to the treatment of talloil whereby to produce useful products of the type described. The present application is a continuation-in-part of Patent No. 2,373,709, issued April 17, 1945, entitled Coating composition and method of making same.

In the aforesaid application for patent there has been described the treatment of talloil, with or without admixture with rosin or the like and reacted with lime under such conditions and to such an extent that a resinous composition is formed. The present invention is directed to similar subject matter and more particularly to improvements both in the method of making the resinous composition and to the production of improved products from said talloil.

Among such improvements is the treatment of the reaction mixture in such a manner as to avoid or minimize foaming which normally takes place some times to a very great extent in the carrying out of the reaction. Another improvement resides in the production of a composition which may be blended with water even without the presence of an emulsifying agent, the coating composition so formed being quite stable and having a high body and capable of being brushed or sprayed onto a surface to be protected. Also, compositions made in accordance with the present invention, even though containing substantial amounts of water, are adapted to be diluted with organic solvents, particularly liquid hydrocarbons such as mineral spirits or the like.

In practicing the present invention there is provided either talloil by itself or a mixture of talloil and rosin. To the mixture a substantial amount of lime is added and a reaction is carried on by heating the mixture for a relatively long time at a high temperature so that the lime not only dissolves in the other constituents but the reaction is carried further so that the products become resinous in character. In order to prevent detrimental foaming during the period of the reaction, there is added to the reaction mixtures a small proportion of a boron compound, preferably borax, which while it does not react with the other constituents, prevents excessive foaming. It appears in the end product, uniformly dispersed throughout the resinous mass and substantially invisible.

The reaction may be conducted in the presence of an organic solvent as for instance a liquid hydrocarbon, the reaction apparatus being fitted with a reflux condenser. During the reaction, any of the mineral spirits which are volatilized and any water vapor which is formed, is refluxed back into the reaction mixture. Upon the completion of the processing, there is obtained a resinous mass which is uniformly dispersed in with a mixture of water and liquid hydrocarbon. Such a solution may then be directly incorporated into paint or enamel compositions. All of the resinous materials formed as set forth above may be heated with water in order to emulsify the same in the water and to make a homogeneous blend. In producing such a water-containing composition, the material takes on body, which is highly desirable in practice. The compositions are suitable for use in coating materials, not only where a dull finish is desired but they have been found suitable for incorporation into such compositions as gloss paint.

The following are a few specific examples of the operation of the present invention and they illustrate the character thereof.

Example I

The reaction mixture consists of the following constituents:

| | Parts by weight |
|---|---|
| Talloil | 570 |
| Rosin | 420 |
| Lime | 114 |
| Borax | 10 |

The talloil and rosin are heated to a temperature of 400° F. in about forty-five minutes. Then the borax is added with stirring in order to uniformly disperse the same in the mixture. Heating is continued to a temperature between 450° and 500° F., while the lime is added slowly and with stirring. Heating is maintained at the maximum temperature for about thirty to sixty minutes or even longer, until a sample taken from the batch and placed on a glass plate will upon cooling form a hard, transparent pill.

The borax remains suspended in the solution. During the reaction there is very little foaming and the conditions of the operation are readily controllable. The resin formed in the reaction has plasticity and is uniform in constitution.

To 30 parts of resin thus formed was added 30 parts of water. The mixture was heated with stirring until the resin had blended with the water to form a viscous emulsion. This emulsion is capable of dilution with more water and with mineral spirits.

An emulsifying agent may be used for producing an emulsion of a resin with water and 30 parts of a 28% ammonia solution in water used in place of the water gives an emulsion which is quite viscous and is capable of considerable dilution, either with water or with liquid hydrocarbons such as mineral spirits.

The above resin was dissolved in mineral spirits and thereafter water was added as set forth above, forming a stable emulsion. The emulsion was much more viscous than the original solution and the viscosity may be reduced by the addition of more mineral spirits or water.

*Example II*

A mixture was made of the following constituents:

| | Parts by weight |
|---|---|
| Talloil | 200 |
| Lime | 8 |

The talloil was first heated to 400° F. in a period of about forty-five minutes and the lime thereafter added thereto gradually and with stirring, the lime dissolved in the talloil. Then the mixture was heated slowly with constant stirring to avoid excessive foaming during the reaction. The temperature was gradually raised to 450° to 500° F. and held at this temperature until a small sample taken from the reaction mass hardened upon chilling in water. The heat was removed and the resinous mass allowed to cool to about 400° F. and 89 parts by weight of mineral spirits were added thereto and incorporated therein by stirring to form a clear solution.

*Example III*

The following constituents were used:

| | Parts by weight |
|---|---|
| Talloil | 990 |
| Lime | 114 |
| Borax | 10 |

The procedure used was the same as in Example I and the borax did not react with the talloil but remained suspended in the solution. There was no foaming during the addition of the lime or the subsequent reactions and the reaction was readily controllable. The resin is somewhat softer than the resin obtained in Example I.

A sample of the resin was mixed in the ratio of 30 parts by weight with 13 parts by weight of water and heated, whereby a viscous emulsion was formed. 20 parts by weight of mineral spirits were added to the emulsion, which remained stable. The amount of water added to the composition was increased until it contained a total of 30 parts by weight, the solution remaining stable.

The resin may be dissolved in liquid hydrocarbons and water added thereto to form an emulsion. Also, in place of water, a 28% ammonia solution may be used.

*Example IV*

To the reaction mixture of Example I is added 100 parts of kerosene, having a flash point of 420° F. The apparatus is fitted with a reflux condenser and heating is conducted as set forth in Example I at a temperature therein stated. However, the time of reaction is increased by 30 to 45 minutes. The water formed in the reaction is condensed together with kerosene vapors which are evolved and returned to the reacting mixture so that after the reaction is complete a homogeneous solution of the resinous mass in kerosene and water is obtained.

This composition may be further diluted with water or with organic solvents, or both.

*Example V*

Various paints or enamels may be made with the products described above. For instance, gloss paints may be made of the following composition:

| | | |
|---|---|---|
| Lithopone | lbs | 180 |
| Calcium carbonate | lbs | 250 |
| Product of Ex. I | gals | 42 |
| Naphtha | gals | 4 |
| Gloss oil | gals | 10 |
| Soap solution | gals | 30 |

The mixture of the constituents may be made as is usual in the varnish industry and the resinous mass may have incorporated into the same the usual driers. This paint composition when properly adjusted to give the desired body had satisfactory brushing and working qualities. The composition had a tendency after long standing to become somewhat more viscous, but the viscosity was readily adjusted to a satisfactory point by dilution with mineral spirits.

Although the invention has been described by the use of several specific examples, it is to be understood that such examples are not intended to limit the invention but to indicate the scope thereof. Many variations in the details of the invention may be made without departing from the spirit thereof. For instance, in place of lime, there may be substituted in whole or in part such metals as magnesium, zinc and the like in the form of oxides, carbonates, hydrates or any other suitable form for reaction with the organic acids, and they are considered to be equivalents of the lime recited in the claims. The amount of lime used in the reaction may vary between about the limits of 4 to 15%, based upon the acids present.

The solvent as set forth in Example IV may be other hydrocarbon fractions and may vary considerably in amounts. This reaction may take place either with or without the removal of water formed in the reaction. A reaction in the presence of mineral spirits has an advantage in that the control of the reaction is better and that a lighter colored resin is formed.

The resulting products may be used as such or may be subjected to a blending operation at an elevated temperature in the presence of air or oxygen to modify the same. Instead of borax other boron compounds capable of preventing foaming may be used.

In some instances it may be desirable to incorporate in the compositions containing water certain protective colloids or emulsifying agents in order to modify the product, but such additions are not essential for the obtaining of water emulsions. Other constituents may be added to the resinous reaction products, such as driers, pigments and other compounds, such as is well-known in the coating composition industry. The specific conditions of the reactions may be varied and the range of temperatures of the reaction may be from 420° to 575° F. At the lower temperatures, more time is required for the completion of the reaction and it may require several hours of heating at the minimum temperature. However, in many cases this is desirable as one is insured of a lighter colored product.

These and other changes in the details of the invention may be made without departing from the spirit thereof and the invention is therefore to be broadly construed and not to be limited except by the character of the claims appended hereto.

I claim:
1. A method of making resinous materials adapted for liquid coating compositions which comprises heating talloil mixed with rosin, the temperature of heating being sufficiently high to cause resinification in the presence of lime, adding thereto borax sufficient in amount to prevent foaming during the reaction, heating said mixture in the presence of 4% to 15% of lime at a temperature between 420° and 525° F. for a sufficient length of time until a sample of said mixture placed upon a glass plate will upon cooling form a hard transparent pill and the material becomes resinous.

2. A method of making resinous materials adapted for liquid coating compositions which comprises heating talloil to a sufficiently high temperature to cause resinification in the presence of lime, adding thereto a substantial amount of lime, the amount of lime being from 4% to 15% of the mixture, heating said mixture at a temperature between 420° and 525° F. for a sufficient length of time until a sample of said mixture placed upon a glass plate will upon cooling form a hard transparent pill and the material becomes resinous.

3. A method of making resinous materials adapted for liquid coating compositions which comprises heating talloil to a sufficiently high temperature to cause resinification in the presence of lime, adding thereto from 4% to 15% of lime, adding thereto a liquid hydrocarbon, heating said mixture at a temperature between 420° and 525° F. for a sufficient length of time until a sample of said mixture placed upon a glass plate will upon cooling form a hard transparent pill and the material becomes resinous under a reflux condenser.

4. A method of making resinous materials adapted for liquid coating compositions which comprises heating talloil to a sufficiently high temperature to cause resinification in the presence of lime, adding thereto a substantial amount of lime, the amount of lime being from 4% to 15% of the mixture, heating said mixture at a temperature between 420° and 525° F. for a sufficient length of time until a sample of said mixture placed upon a glass plate will upon cooling form a hard transparent pill and the material becomes resinous.

5. A method of making resinous materials adapted for liquid coating compositions which comprises heating talloil to a sufficiently high temperature to cause resinification in the presence of lime, adding thereto a substantial amount of lime, the amount of lime being from 4% to 15% of the mixture, heating said mixture at a temperature between 420° and 525° F. for a sufficient length of time until a sample of said mixture placed upon a glass plate will upon cooling form a hard transparent pill and the material becomes resinous, and blending said product with water.

6. A method of making resinous materials adapted for liquid coating compositions which comprises heating talloil to a sufficiently high temperature to cause resinification in the presence of lime in the presence of a sufficient amount of borax to prevent foaming during the reaction, adding thereto a substantial amount of lime, the amount of lime being at least 4% of the mixture, heating said mixture at a temperature between 420° and 525° F. for a sufficient length of time until a sample of said mixture placed upon a glass plate will upon cooling form a hard transparent pill and the material becomes resinous.

7. A liquid coating composition containing as the essential film-forming constituent the reaction product of talloil with lime, the amount of lime being from 4% to 15% of the mixture and being so large as to form a gel if similarly combined with resin acids alone, said product being a hard resin and ungelled, blended with water, and capable of solution in hydrocarbon solvents said product being formed by heating at a temperature between 420° and 525° F. for a sufficient length of time to form a hard resin.

8. A liquid coating composition containing as the essential film-forming constituent the reaction product of talloil with lime, the amount of lime being from 4% to 15% of the mixture and being so large as to form a gel if similarly combined with resin acids alone, said product being a hard resin and ungelled, and capable of solution in hydrocarbon solvents said product being formed by heating at a temperature between 420° and 525° F. for a sufficient length of time to form a hard resin.

9. A liquid coating composition containing as the essential film forming constituent the reaction product of talloil with lime, the amount of lime being at least 4% of the mixture and being so large as to form a gel if similarly combined with resin acids alone, said product being a hard resin and ungelled, blended with water, and capable of solution in hydrocarbon solvents, said product being formed by heating at a temperature between 420° and 525° F. for a sufficient length of time to form a hard resin.

WILLIAM J. RICE.

REFERENCES CITED

The following references are of record in the file of this patent:

UNITED STATES PATENTS

| Number | Name | Date |
| --- | --- | --- |
| 2,373,709 | Rice | Apr. 17, 1945 |
| 2,367,462 | Farber | Jan. 16, 1945 |
| 2,175,491 | Stresen-Reuter | Oct. 10, 1937 |